April 13, 1965  C. E. PAUL ETAL  3,178,622
ELECTRICAL CAPACITOR WITH THERMAL FUSE
Filed March 26, 1964  3 Sheets-Sheet 1
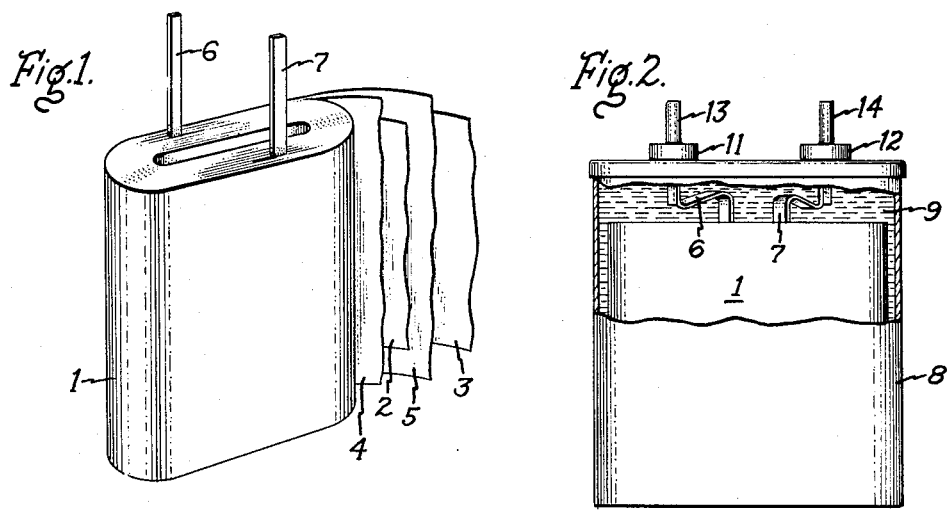
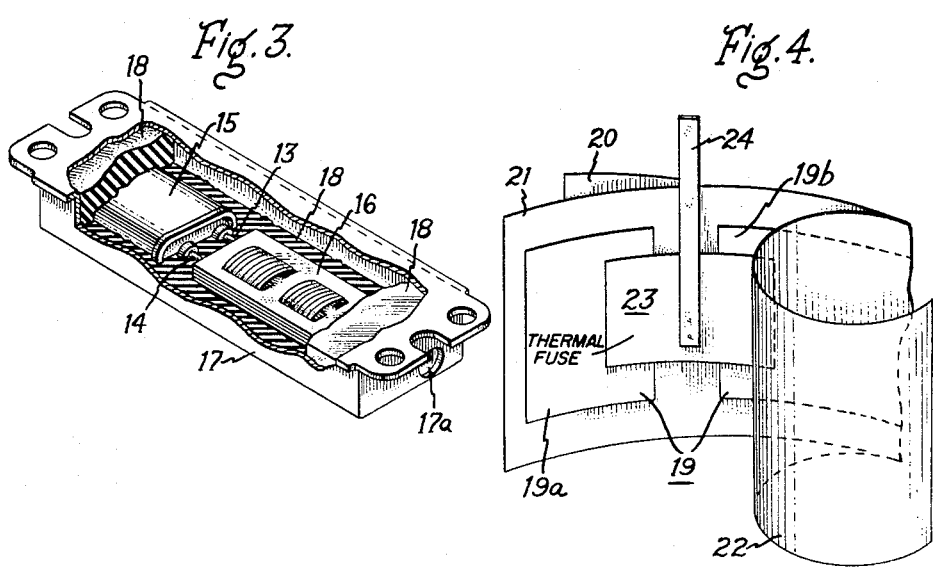
Inventors,
Carl E. Paul,
Frederick W. Grahame,
by Sidney Greenberg
Their Attorney.

April 13, 1965 C. E. PAUL ETAL 3,178,622
ELECTRICAL CAPACITOR WITH THERMAL FUSE
Filed March 26, 1964 3 Sheets-Sheet 2
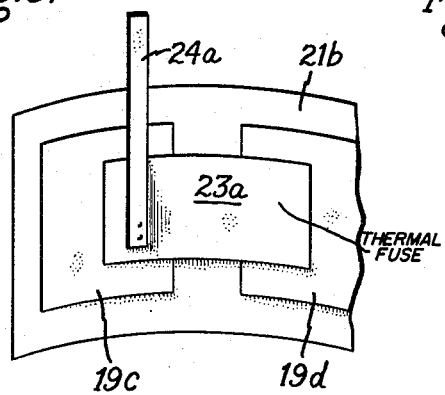
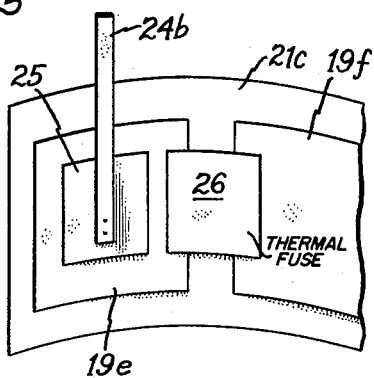
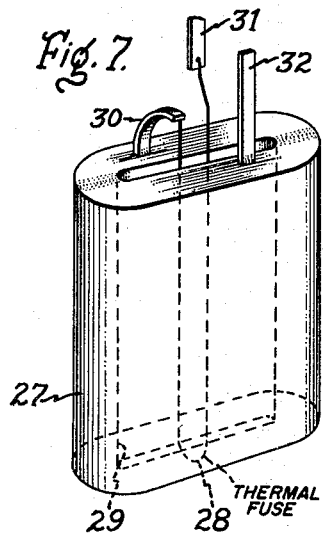
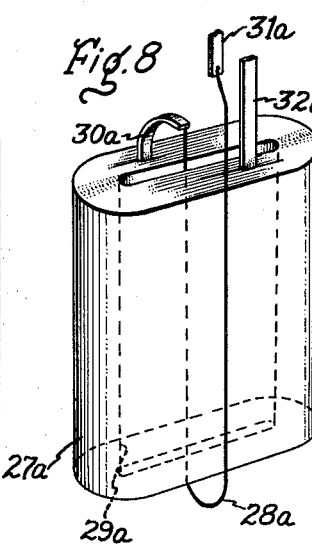
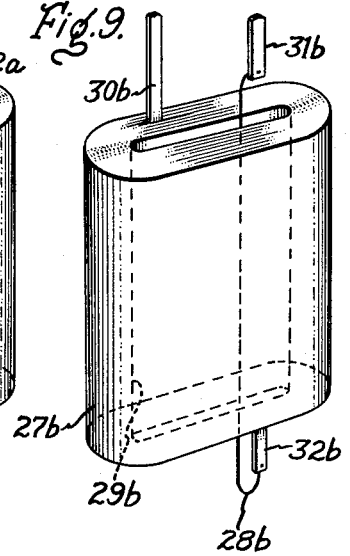
Inventors,
Carl E. Paul,
Frederick W. Grahame,
by Sidney Greenberg
Their Attorney.

April 13, 1965    C. E. PAUL ETAL    3,178,622
ELECTRICAL CAPACITOR WITH THERMAL FUSE
Filed March 26, 1964    3 Sheets-Sheet 3
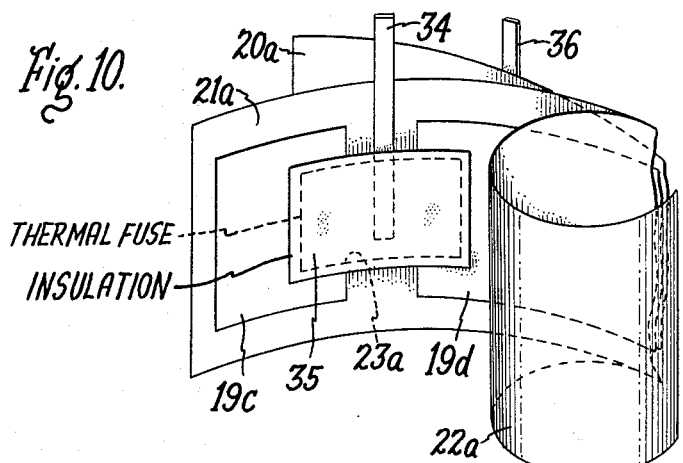
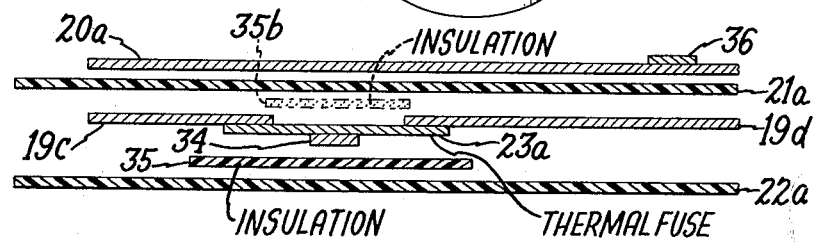
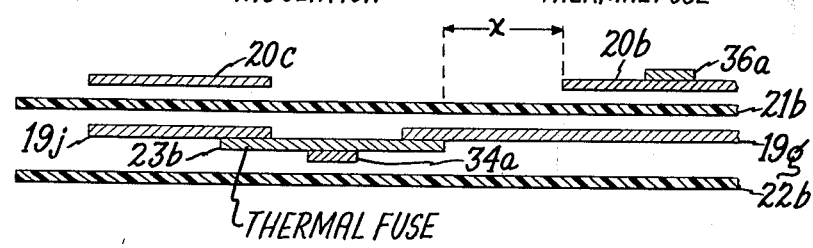
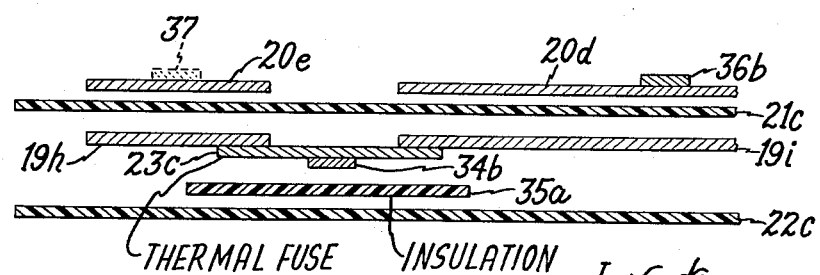
Inventors,
Carl E. Paul,
Frederick W. Grahame,
by Sidney Greenberg
Their Attorney.

United States Patent Office 3,178,622
Patented Apr. 13, 1965

3,178,622
ELECTRICAL CAPACITOR WITH THERMAL FUSE
Carl E. Paul, Glens Falls, and Frederick W. Grahame, Fort Edward, N.Y., assignors to General Electric Company, a corporation of New York
Filed Mar. 26, 1964, Ser. No. 357,345
16 Claims. (Cl. 317—256)

This application is a continuation-in-part of co-pending application Serial No. 197,413, filed May 24, 1962, now abandoned, which in turn was a continuation-in-part of co-pending application Serial No. 113,459, filed May 29, 1961, now abandoned, both assigned to the same assignee as the present application.

The present invention relates to electrical capacitors, and more particularly concerns electrical capacitors suitable for use in fluorescent lamp ballast circuits.

In conventional fluorescent lamp ballast construction, a metal-encased ballast capacitor is normally embedded, along with other ballast components, in the ballast housing by a potting compound containing asphalt. It has been found that when failures occur in such capacitors during operation of the ballast, in many cases the failure is due to a "thermal runaway" condition wherein the temperature within the capacitor rises rapidly and pressures are developed within the capacitor which may eventually rupture the metal capacitor casing. Following such rupture, the liquid dielectric impregnant normally contained in such capacitors may escape and come into contact with the asphalt potting compound. The liquid mixture thereby formed may then leak out of the fluorescent lamp fixture and cause damage to the fixture, furniture, and other objects in the vicinity.

It is an object of the invention to provide an electrical ballast capacitor which avoids the above-described difficulties.

It is another object of the invention to provide an electrical capacitor having a thermal fuse device which ensures early and effective protection against the effects of excessive temperatures developed in the capacitor.

It is still another object of the invention to provide a thermally fused capacitor of the above type wherein the fuse action may either open or short the capacitor circuit.

It is still a further object of the invention to provide a wound thermally protected capacitor of the above type which is readily and economically manufactured.

A further object of the invention is to provide for reducing or eliminating the dielectric stress in the region of the fusible member employed in the above-described capacitor in order to avoid premature damage to the dielectric separator incorporated in the capacitor.

Other objects and advantages will become apparent from the following description and the appended claims.

With the above objects in view, the present invention in its broad aspects relates to an electrical capacitor formed of an assembly of cooperating conductive electrodes and interposed dielectric spacer material, the assembly being enclosed in a casing having a dielectric liquid therein, and thermal fuse means arranged in the capacitor assembly and operative for discontinuing the operation of the capacitor prior to rupture of the casing due to elevated temperatures created within the capacitor assembly.

In a particular aspect, the capacitor assembly is formed of a convolutely wound compact roll comprising at least two conducting strip-shaped electrodes interwound with interposed dielectric spacing material, the thermal fuse means being operatively associated with one of the conducting electrodes and disposed in the roll within the region thereof defined by the innermost ⅓ of the length of the electrodes.

In another aspect, the capacitor of the invention incorporates means for reducing the electrical stress in the region of the fusible member to avoid the migration of the conductive material thereof.

The invention will be better understood from the following description taken in conjunction with the accompanying drawings, in which:

FIGURE 1 is a perspective view of a partially unrolled capacitor roll of a type in which the present invention may be suitably embodied;

FIGURE 2 is a view partly in section showing the capacitor roll of FIGURE 1 enclosed within a casing;

FIGURE 3 is a view of a fluorescent lamp ballast unit, partially cut away, which may embody the present invention;

FIGURES 4, 5, and 6 show portions of a capacitor illustrating various embodiments of one type of thermal fuse arrangement of the invention;

FIGURES 7, 8, and 9 show capacitor roll sections illustrating various embodiments of a different type of thermal fuse arrangement of the invention;

FIGURE 10 is a view of a modified form of the FIGURE 4 arrangement;

FIGURE 11 is a cross-sectional, somewhat schematic, view of the FIGURE 10 arrangement; and FIGURES 12 and 13 are views similar to that of FIGURE 11 illustrating other embodiments of the invention.

Referring now to the drawings, and particularly to FIGURE 1, there is shown a rolled capacitor section 1 comprising a pair of electrodes 2 and 3 of electrically conducting foil material such as aluminum or other suitable electrode material and a pair of dielectric strips 4 and 5 composed of any suitable insulating material such as kraft paper, the foil and dielectric strips being alternately disposed and convolutely wound into a compact roll which may be somewhat flattened as shown. Each dielectric strip may be comprised of one or more insulating sheets, and as shown, the dielectric strips normally have a greater width than the electrode foils 2 and 3 so as to prevent short circuiting between the foils of opposite polarity. Electrical connection to the electrode foils is made by means of lead-in tap straps 6 and 7, strap 6 being connected to foil electrode 3 in conventional manner and strap 7 being connected to foil 2 by means of an arrangement more fully described hereinafter.

FIGURE 2 shows capacitor roll section 1 assembled in a casing 8 usually of a metal such as steel and immersed therein in a dielectric liquid impregnant 9 of conventional composition such as chlorinated diphenyl or mineral oil. Casing 8 is hermetically sealed by cover 10 which is provided with insulating bushings 11 and 12 and external terminals 13 and 14 connected respectively to tap straps 6 and 7.

In accordance with the invention, a thermal fuse is located at or near the central (i.e., axial) portion of capacitor roll 1 in order to assure early fusing action upon occurrence of excessive capacitor temperatures during operation. We have found that the temperature of the capacitor dielectric during thermal runaway is greatest at the inner region of the capacitor roll and decreases outwardly. We have confirmed by temperature measurements taken during thermal runaway the existence of a substantial temperature gradient from the start of the capacitor roll to the capacitor case, e.g., about 400° C. at the center of the roll and about 100° C. at the capacitor case at the time of capacitor failure. In order to prevent progressive heating from causing the capacitor case to rupture, we have found it essential to provide for operation of the thermal fuse element quite soon after thermal runaway starts. Experience has shown that if the thermal fuse element is located too far out in the roll, the case may rupture before enough heat reaches the thermal fuse to actuate it.

FIGURE 3 shows the encased capacitor 15 of the above-described construction arranged in operative combination with a fluorescent lamp ballast unit including a transformer 16, the ballast components being contained in a covered housing 17 and encapsulated with an asphalt potting material 18, in accordance with usual practice. The electrical connection of capacitor terminals 13, 14 to transformer 16 and other details of the ballast circuit are conventional and well-known, a typical fluorescent lamp ballast circuit being disclosed, for example, in the patent to Mead 2,961,606, and accordingly a description of the ballast circuit or electrical interconnection, which form no part of the present invention, is considered unnecessary herein.

The difficulty encountered with prior art fluorescent ballast units of the FIGURE 3 type has resulted from leakage of the liquid impregnant from the ruptured capacitor case into the surrounding asphalt material, due to pressures generated by thermally activated changes in the capacitor material, and the consequent dripping of the black, unsightly asphalt-containing liquid out of the ballast housing via lead aperture 17a or between the housing and its cover.

FIGURE 4 shows in fragmentary form the inner (i.e., starting) end of a capacitor roll embodying one form of the invention and comprising alternately arranged electrode foils 19 and 20 with interposed dielectric strips 21 and 22. Electrode 19 comprises inner portion 19a separated by a gap from outer or main portion 19b, the gap being bridged by a thermally fusible electrically conducting strip 23 having a lead-in tap strap 24 secured thereto by spot welding or any other suitable means. Although shown associated with foil 19, the thermal fuse assembly may instead be applied to foil 20, which would in such case have the necessary gap.

In order to achieve the purposes of the invention, the location of the fuse member 23 should be a distance from the inner end of the winding which is not more than about ⅓ the total length of the capacitor winding. In other words, the fuse member 23 should be located in the central region of the capacitor roll which is defined by the innermost ⅓ of the length of the electrode 19. In a typical ballast capacitor construction, the length of the foil strips is about 60 feet (the dielectric strips being somewhat longer), hence the thermal fuse element 23 will be located within a distance ranging from 0 to 20 feet from the inner end of the electrode foil 19 on which it is placed. The actual distance within such range may vary depending upon the specific melting point of the thermal fuse element; thus, the lower the melting point, the farther out the fuse element can be placed. A particular location which has been found quite satisfactory is about one foot from the inner end in the above-mentioned typical construction. This arrangement is desirable from the standpoint of convenience in properly forming the gap in the electrode foil and inserting the tap fuse assembly using conventional capacitor winding machines and, further, it appears that the region where the temperature level is highest during early stages of thermal runaway is in the winding near (but not actually at) the center of the roll. Apparently, the presence of liquid impregnant in the axial opening of the capacitor roll has some heat dissipating effect on the portion of the capacitor winding immediately adjacent the opening.

In a typical construction of the FIGURE 4 form, which is set forth herein simply for illustrative purposes, the thickness of the fusible foil element 23 may be about .0003 to .0005 inch and have dimensions of about 4⅜ inches by 1¼ inches, while the length of the gap between foil portions 19a, 19b is about 1⅛ inches.

The form of the thermal fuse-tap strap assembly 23, 24 makes it readily adaptable to automatic insertion between foil 19 and dielectric strip 22 by mechanical means in the manner that a tap strap is automatically inserted in a capacitor roll as disclosed in Hogue et al. Patent 2,547,644, issued April 3, 1951, and assigned to the same assignee as the present application. Thus, a continuous strip of thermally fusible material may be prepared with a number of tap straps 24 suitably secured thereto at spaced intervals and the thus prepared strip may be wound up into a roll suitable for mounting on a spindle of a capacitor winding machine. Thereafter, in a manner similar to that disclosed in the aforementioned Hogue et al. patent, the continuous fuse strip may be automatically cut into separate tap-fuse assemblies which are fed at intervals into the capacitor roll being wound. In making the capacitor in accordance with the present invention, the foil electrode strip against which the fuse-tap assembly is laid will have a gap of suitable length provided therein by any suitable means.

The invention is applicable not only to two-terminal capacitors of the type shown in FIGURE 1, wherein each main foil has one terminal, but also to a three-terminal capacitor of known type. In such capacitors the main foil other than that in series with the fusible element is made up of two longitudinally separated foil strips each having a tap strap secured thereto.

FIGURE 5 shows another embodiment of the thermal fuse assembly which is similar to that shown in FIGURE 4 except that fuse element 23a extends farther over the end foil portion 19c, and tap strap 24a is secured to the extended fuse portion so that it overlies foil portion 19c. This arrangement has the advantage that the tap strap is located farther from main foil strip 19d and there is reduced risk of having the tap placed too close to the main foil 19d by the mechanical inserting procedure.

FIGURE 6 shows still another modification wherein tap strap 24b is mounted on conductive strip 25 separate from thermal fuse strip 26. An advantage of this construction is that fuse strip 26, not having to support tap strap 24b during the winding operation, may be made thinner than ordinarily required and would thereby have improved fusing action. Other advantages are that the width of fuse 26 may be made smaller than that in the other embodiments, if desired, without being limited by considerations of necessary contact area with the tap strap or support of the latter. Further, the nature of the fusible element may be conveniently varied; for example, it could comprise a nonconductive carrier sheet such as paper or plastic film upon which a coating of electrically conductive, thermally fusible metal is deposited by any suitable means, and such sheet would, of course, be placed with the metal coating in contact with and bridging the separated portions 19e, 19f of foil 19.

The thermal fuse element, whether of the foil or metal coated type or other form, should in accordance with the invention have a melting temperature in the range of about 100° C. to 400° C. and should be a good electrical conductor. Fusible elements melting below 100° C. would normally be unsuitable due to the drying process usually applied to ballast capacitors during their manufacture and which might otherwise prematurely melt the fuse. Special low temperature drying or other heating processes would, of course, permit use of lower temperature melting materials as the fuse. Melting temperatures above about 400° C. would not ensure sufficiently rapid fusing action for the purposes of the invention. In particular, a range of melting points of 190° C. to 250° C. is preferred, such temperatures being those not normally exceeded by the maximum temperatures encountered in the manufacture and operation of the capacitor prior to failure in service, while being sufficiently low to ensure effective fuse operation in the event of thermal runaway conditions.

The following are examples of thermal fuse materials which have been found satisfactory for the purposes of the invention, it being understood that these compositions are simply illustrative and that a great number and variety of other thermally fusible materials could be employed if desired:

Example I:

| | Percent |
|---|---|
| Tin | 91 |
| Zinc | 9 |

Melting point about 205° C.

Example II:

| | |
|---|---|
| Tin | 83 |
| Lead | 15 |
| Antimony | 2 |

Melting point about 245° C.

Example III:

| | |
|---|---|
| Tin | 46 |
| Lead | 52 |
| Antimony | 2 |

Melting point about 208° C.

Example IV:

| | |
|---|---|
| Tin | 100 |

Melting point, 232° C.

FIGURES 7, 8 and 9 show other types of thermal fuse arrangements which may in certain cases be found advantageous for use in accordance with the invention. FIGURE 7 shows a convolutely wound capacitor roll 27 of conventional construction except that an electrically conducting, thermally fusible link 28, having the melting point properties of the thermal fuse elements previously described, is inserted into arbor hole 29 of capacitor 27 in the form of a loop and connected in series with tap strap 30 secured to the wound foil electrode of one polarity and with terminal member 31 which is to be secured to the external terminal of the capacitor casing. The other tap strap 31 is secured to the wound foil electrode of the other polarity. Thermal link 28 is typically a .025-inch diameter wire composed of 60% tin–40% lead.

In the FIGURE 8 embodiment thermal link 28a extends entirely through the arbor hole 29a and passes upwardly on the outside of the capacitor roll to terminal member 31a.

In the modification shown in FIGURE 9, capacitor 27b is of the type having tap straps 30b and 32b of opposite polarity projecting from opposite ends of the capacitor roll, and in this case fusible link 28b passes through arbor hole 29b between, and is connected in series with, bottom tap strap 32b and terminal member 31b.

As will be understood, the capacitor rolls of FIGURES 7, 8 and 9 will, in operative assembly, be flattened and enclosed in a sealed casing containing a dielectric liquid impregnant as disclosed and shown in connection with FIGURE 2.

The capacitors shown in FIGURES 7–9 provide an advantage, as compared to those of FIGURES 4–6, in the possibility of having both tap straps connected midway of the length of their respective foil electrodes, an arrangement which produces lower power factor than one wherein one or both taps are connected near an end of the foil electrode. On the other hand, the capacitors of FIGURES 4–6 have the advantage that the thermal fuse is located closer to the region of highest temperature at the onset of thermal runaway conditions.

There is thus provided by the invention effective protection from the risk of impregnant leakage from electrical capacitors resulting from thermal runaway conditions which may be experienced in the operation of the capacitors and which leads to substantial damage as hereinabove explained.

While the fusing of electrical capacitors is known in the art, such fusing has generally been designed to protect against excessive current in the capacitor due to faults in the circuit, and consequently the fuses employed heretofore have been of the type that are actuated by excessive current and which cause an open circuit rather than a short circuit. Due to the unusual electrical characteristics of fluorescent lamp ballast circuits, however, the fuse provided by the present invention is not of the ordinary electrical type used for capacitors in other applications. In such ballast circuits the capacitor current may change very little when the capacitor shorts and may actually decrease upon shorting of the capacitor. The nature and arrangement of the present fuse is such that it will operate quickly and effectively to halt the increase in temperature developed in the capacitor which would, if unchecked, lead to leakage of the impregnant therefrom. For the purposes of the present invention it would not be satisfactory simply to provide a fuse of ordinary electrical type, nor would the fuse be effective for the present purposes unless located in the region of the capacitor assembly as taught herein. Further, whether the fuse herein described causes an open or a short circuit is not of substantial significance so far as the present invention is concerned.

It has been found, in accordance with another aspect of the invention, that when the fusible alloy strip 23 (see FIGURE 4) is under a dielectric stress in the operation of the capacitor, the metal of the alloy in certain cases gradually migrates into the dielectric spacer 22 adjacent thereto. This migration results in a severe highly localized heating which burns the paper dielectric and creates brown charred areas, resulting in some cases in local dielectric failure. Such migration effects under electrical stress are noted in the use of such metals as copper, tin, lead, silver, and alloys thereof, as contrasted to metals such as aluminum or stainless steel which do not appear to be similarly affected. In accordance with the present invention, the aforementioned problem is overcome by (1) reducing the dielectric stress exerted on the fusible alloy strip 23 by shielding it with additional dielectric separator material, or (2) eliminating the dielectric stress entirely by removing at least the portion of electrode 20 which is opposite the fusible alloy member 23, or (3) using a combination of both methods (1) and (2).

Thus, in accordance with one embodiment of the invention, as shown in FIGURE 10, a dielectric backing sheet 35 of material which may be similar to that of dielectric spacer material 21a or 22a is superimposed on fusible alloy strip 23a so that it intervenes between dielectric sheet 22a and fusible alloy strip 23a. To be effective, dielectric strip 35 must be at least coextensive with fusible alloy strip 23a. Such an added dielectric strip on one side of the fusible member reduces the dielectric stress in this critical region, and thus retards the rate of metal migration from the fusible alloy while at the same time increasing the dielectric thickness through which the migration must occur. Dielectric strip 35 normally may be about the same thickness as that of the main dielectric spacer strips, e.g., about .75 mil, and may be composed of such insulating material as kraft paper, Mylar, polyethylene, cellulose acetate, Teflon, or any other suitable dielectric material chemically compatible with the liquid impregnant used in the capacitor.

FIGURE 11 is a diagrammatic cross-sectional view of the FIGURE 10 arrangement, the components being shown in spaced relation for clarity of illustration. As shown, main electrodes 19 and 20a are separated by dielectric sheets 21a and 22a, electrode 19 having spaced portions 19c and 19d forming a gap bridged by fusible foil strip 23a having tap strap 34 secured thereto. Dielectric backing sheet 35 is shown interposed between fusible alloy member 23a and dielectric sheet 22a, as above-described. Further protection may be provided, if desired, by the addition of another dielectric sheet 35b (shown in dotted lines) intervening between the opposite exposed surface of alloy foil 23a and dielectric sheet 21a. Such sheet 35b need only be at least coextensive with the exposed surface of fusible member 23a facing it. There is thereby provided protection from migration of the fusible alloy material into the dielectric sheets on opposite sides of fusible alloy member 23a.

As will be understood, the means provided by the present invention for avoiding such migration are applicable to other forms of fused capacitors described above.

FIGURE 12 shows an embodiment of the invention in which the aforementioned dielectric stress on the fuse member is entirely removed, and wherein a dielectric backing sheet is entirely dispensed with. As shown, fusible alloy strip 23b is placed in contact with electrode strip portions 19j, 19g bridging the gap therebetween, and the other electrode composed of dummy portion 20c and operative main portion 20b is so arranged that the innermost end of portion 20b is offset toward its outer end from the fusible alloy strip, so that in the wound roll, alloy strip 23b does not face any portion of electrode 20b across the adjacent turn of dielectric strip 21b or dielectric strip 22b. Preferably, the amount of offset indicated by distance $x$ in FIGURE 12 should be a minimum of one turn. As will be understood, electrode portions 20c and 19j may be omitted, if desired.

FIGURE 13 shows another embodiment of the invention combining the features of both embodiment described above. In this device, electrode 20 is formed of two spaced components 20e and 20d forming a gap located opposite a similar gap formed in electrode 19 between components 19h and 19i which is bridged by fusible alloy sheet 23c. On the opposite side of alloy member 23c is arranged a dielectric backing sheet 35a as described in connection with FIGURE 11. Dielectric strips 21c and 22c separate the electrodes as in the previously described embodiments. In this device, the dielectric stress on the upper surface of alloy member 23c is avoided by virtue of the gap in electrode strip 20, while the dielectric stress on the opposite surface of alloy strip 23c is reduced by virtue of the presence of dielectric backing sheet 35a. In this form of the device, portion 20e of electrode 20 may be simply an electrically inoperative portion, being inserted simply for facilitating the winding operation on conventional winding machines. Alternatively, this arrangement may be used for a two-section, three-terminal capacitor by affixing a tap strap 37, shown in dotted lines, so as to provide such a capacitor having a common fused electrode 19h, 19i with separate opposite electrodes 20e and 20d, each with a tap strap.

Comparative tests conducted to determine the relative life obtained in capacitors of the above-described type without the dielectric stress reducing means of the invention showed that capacitors constructed in accordance with this feature of the invention had substantially lower failure rates than those without the benefits of this feature. In these tests capacitors of 2.2 $\mu$f. 540 volts A.C. rating were subjected to test conditions of 100° C. and 667 volts per mil of dielectric. The fusible alloys of the first group of capacitors tested were composed of 83% tin, 15% lead and 2% antimony. Capacitors with such fusible alloys and having the construction of the invention substantially as shown in FIGURE 13 failed in an amount of only 14% at 992 hours, whereas capacitors with the same fusible alloys but of the type shown in FIGURE 4 and without the described gap arrangement and dielectric backing strip failed at the rate of 57% at 489 hours.

In a similar test in which the fusible alloy was composed of 99.5% tin and 0.5% copper, only 7% of the capacitors constructed in accordance with this feature of the present invention failed at 992 hours, whereas 71% of the FIGURE 4 design failed at 454 hours.

These tests thus clearly demonstrated the value of removing or substantially reducing the dielectric stress in the region of the fusible alloy in accordance with the invention.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising, in combination, a sealed casing, a convolutely wound compact roll in said casing formed of at least two conducting strip-shaped electrodes interwound with interposed dielectric spacer material, said electrodes having inner ends near the axis of the roll, and thermal fuse means for discontinuing the operation of the capacitor prior to rupture of said casing due to elevated temperature within said roll, said thermal fuse means comprising a thermally fusible member composed of electrically conducting material having a melting point of about 190°–250° C. and connected in series with one of said electrodes in the region of said roll defined by the innermost one-third of the length of said one electrode.

2. An electrical capacitor for fluorescent lamp ballasts comprising in combination, a sealed casing, a dielectric liquid in said casing, a capacitor section in said casing impregnated with said dielectric liquid and formed of a convolutely wound compact roll of at least two conducting strip-shaped electrodes interwound with interposed dielectric spacer material, said electrodes having inner ends near the axis of the roll, said casing being subject to rupture due to elevated temperature within said roll resulting in escape of dielectric liquid from said casing, and thermal fuse means for discontinuing the operation of the capacitor prior to rupture of said casing due to elevated temperature within said roll, said thermal fuse means comprising a thermally fusible member composed of electrically conducting material having a melting point not exceeding about 400° C. and connected in series with one of said electrodes in the region of said roll defined by the innermost one-third of the length of said one electrode.

3. An electrical capacitor for fluorescent lamp ballasts comprising, in combination, a sealed casing, a dielectric liquid in said casing, a capacitor section in said casing impregnated with said dielectric liquid and formed of a convolutely wound compact roll of at least two conducting strip-shaped electrodes interwound with interposed dielectric spacer material, said electrodes having inner ends near the axis of the roll and one of said electrodes having a gap therein in the innermost one-third of its length dividing said one electrode into inner and outer portions, and thermal fuse means for discontinuing the operation of the capacitor prior to rupture of said casing due to elevated temperature within said roll, said thermal fuse means comprising electrically conducting means having a melting point of about 100–400° C. and arranged bridging said gap in said one electrode, and lead-in tap means connected in series with said outer electrode portion and spaced therefrom by said thermal fuse means.

4. An electrical capacitor as defined in claim 3, wherein said lead-in tap means is secured to the fuse means in the region of said gap.

5. An electrical capacitor as defined in claim 3 wherein said lead-in tap means is secured to the fuse means in the region thereof overlying the inner electrode portion.

6. An electrical capacitor as defined in claim 3, wherein said lead-in tap means overlies said inner electrode portion and is separate from said fuse means.

7. An electrical capacitor comprising, in combination, a convolutely wound roll formed of at least two electrodes interwound with interposed dielectric spacer material, thermal fuse means electrically connected to one of said electrodes for discontinuing the operation of the capacitor at a predetermined temperature within said roll, said thermal fuse means comprising a fusible member composed of electrically conducting material subject to migration under electrical stress, and means on opposite sides of said fusible member at least coextensive with the opposite exposed surfaces of the latter for reducing the electrical stress in the region of said fusible member to reduce the migration of said electrically conducting material.

8. An electrical capacitor comprising, in combination, a casing, a convolutely wound compact roll in said casing formed of at least two conducting strip-shaped electrodes interwound with interposed dielectric spacers, thermal fuse means electrically connected to one of said electrodes for discontinuing the operation of the capacitor prior to rupture of said casing due to elevated temperature within said roll, said thermal fuse means comprising a fusible member composed of conducting material subject to migration under electrical stress, and means comprising dielectric sheets on opposite sides of said fusible member at least coextensive with the opposite exposed surfaces of the latter facing the respective dielectric spacers next adjacent thereto for reducing the migration of said conducting material of said fusible member.

9. An electrical capacitor comprising, in combination, a pair of superposed cooperating electrodes and interposed dielectric spacer material, thermal fuse means electrically connected to one of said electrodes for discontinuing the operation of the capacitor at elevated temperatures therein, said fuse means comprising fusible conducting material subject to migration under electrical stress, and means comprising an opening in the other electrode in the region thereof next adjacent and opposite at least one side of said fusible member for reducing the electrical stress in the region of said fusible member to avoid the migration of said conducting material.

10. An electrical capacitor comprising, in combination, a casing, a convolutely wound compact roll in said casing formed of at least two conducting strip-shaped electrodes interwound with interposed dielectric spacer material, thermal fuse means electrically connected to one of said electrodes for discontinuing the operation of the capacitor prior to rupture of said casing due to elevated temperature within said roll, said thermal fuse means comprising a fusible member composed of conducting material subject to migration under electrical stress, and means comprising an opening in the other electrode in the region of said fusible member to avoid the migration of said conducting material to said dielectric spacer material.

11. An electrical capacitor comprising, in combination, a casing, a convolutely wound compact roll in said casing formed of at least two conducting strip-shaped electrodes separated by interposed dielectric spacer strips, and thermal fuse means electrically connected to one of said electrodes near its innermost end for discontinuing the operation of the capacitor prior to rupture of said casing due to elevated temperature within said roll, said thermal fuse means comprising a fusible member composed of conducting material subject to migration under electrical stress, the inner end of said other electrode being offset toward its outer end from said fusible member for reducing electrical stress in the region of said fusible member to avoid the migration of said conducting material.

12. An electrical capacitor comprising, in combination, a casing, a convolutely wound compact roll in said casing formed of at least two conducting strip-shaped electrodes separated by interposed dielectric spacer strips, and thermal fuse means electrically connected to one of said electrodes near its innermost end for discontinuing the operation of the capacitor prior to rupture of said casing due to elevated temperature within said roll, said thermal fuse means comprising a fusible member composed of conducting material, subject to migration under electrical stress, the inner end of said other electrode being offset toward its outer end from said fusible member a distance equivalent to at least one turn of said roll for reducing electrical stress in the region of said fusible member to avoid the migration of said conducting material.

13. An electrical capacitor comprising, in combination, a convolutely wound roll formed of a pair of superposed conducting strip-shaped electrodes interwound with interposed dielectric spacer strips, each electrode having a gap therein opposite the gap in the other electrode, and fuse means for discontinuing the operation of the capacitor due to elevated temperature within said roll, said thermal fuse means comprising a fusible member bridging the gap in one electrode, said fusible member being composed of conducting material subject to migration under electrical stress.

14. An electrical capacitor comprising, in combination, a casing, a convolutely wound compact roll in said casing formed of a pair of superposed conducting strip-shaped electrodes interwound with interposed dielectric spacer strips, said electrodes having opposite gaps therein in the innermost one-third of their length, thermal fuse means for discontinuing the operation of the capacitor prior to rupture of said casing due to elevated temperature within said roll, said thermal fuse means comprising a fusible member arranged bridging the gap in one electrode with one side facing the gap in the other electrode and composed of conducting material subject to migration under electrical stress, a dielectric sheet between said fusible member and the next adjacent portion of said other electrode on the other side of said fusible member, said dielectric sheet being at least coextensive with said fusible member, for reducing the electrical stress in the region of said fusible member and thereby reducing the migration of said conducting material.

15. An electrical capacitor comprising, in combination, a casing, a convolutely wound roll in said casing formed of a pair of superposed conducting strip-shaped electrodes interwound with interposed dielectric spacer strips, said electrodes having opposite gaps therein in the innermost one-third of their length dividing said electrodes into inner and outer portions, thermal fuse means for discontinuing the operation of the capacitor prior to rupture of said casing due to elevated temperature within said roll, said thermal fuse means comprising a fusible member arranged bridging the gap in one electrode with one side facing the gap in the other electrode and composed of conducting material subject to migration under electrical stress, a dielectric sheet between said fusible member and the next adjacent portion of said other electrode on the other side thereof and at least coextensive with said fusible member, for reducing the electrical stress in the region of said fusible member and thereby reducing the migration of said conducting material and lead-in tap means connected to each of the inner and outer portions of said other electrode.

16. An electrical capacitor comprising, in combination, a casing, a dielectric liquid in said casing, a convolutely wound roll in said casing immersed in said dielectric liquid and formed of a pair of superposed conducting strip-shaped electrodes interwound with interposed dielectric spacer strips, one of said electrodes having a gap therein in the innermost one-third of its length, thermal fuse means for discontinuing the operation of the capacitor prior to rupture of said casing due to elevated temperature within said roll, said thermal fuse means comprising a fusible member arranged bridging the gap in said one electrode and composed of conducting material subject to migration under electrical stress, and a dielectric sheet between said fusible member and the next adjacent portion of said other electrode on one side of said fusible member at least coextensive therewith for reducing the electrical stress in the region of said fusible member and thereby reducing the migration of said conducting material.

References Cited by the Examiner

UNITED STATES PATENTS

| | | | |
|---|---|---|---|
| 1,192,879 | 8/16 | Ferrell | 200—113 |
| 2,473,034 | 6/49 | Shaheen | 317—99 |
| 2,704,341 | 3/55 | Stacy et al. | 317—256 |
| 2,791,736 | 5/57 | Schaeffer | 317—12 |
| 2,851,557 | 9/58 | Hanson et al. | 317—12 |
| 2,896,049 | 7/59 | Maier | 200—113 |
| 3,021,589 | 2/62 | Weller | 317—242 |

FOREIGN PATENTS 605,589   11/34   Germany.

JOHN F. BURNS, *Primary Examiner.*